United States Patent [19]

Whitaker

[11] 4,130,285

[45] Dec. 19, 1978

[54] VALVE SEALING DEVICE

[75] Inventor: Ritchie W. Whitaker, Claremont, Calif.

[73] Assignees: Walworth Company, Valley Forge, Pa.; Kryoflo, Inc., Santa Ana, Calif.

[21] Appl. No.: 872,731

[22] Filed: Jan. 26, 1978

[51] Int. Cl.$^2$ .................. F16K 25/00; F16J 15/32; F16J 15/48

[52] U.S. Cl. .................. 277/12; 277/26; 277/152; 277/206 R; 251/173; 251/11; 251/306

[58] Field of Search .................. 251/11, 172, 173, 210, 251/305-307; 277/26, 12, 165, 152, 27, 188 A, 206 R

[56] References Cited

U.S. PATENT DOCUMENTS

| 3,184,213 | 5/1965 | Anderson | 251/172 |
| 3,334,927 | 8/1967 | Faccou | 277/26 X |
| 3,591,189 | 7/1971 | Tootle et al. | 277/26 X |
| 3,632,119 | 1/1972 | Carpenter | 277/26 |

FOREIGN PATENT DOCUMENTS

| 708075 | 4/1965 | Canada | 251/173 |
| 907621 | 10/1962 | United Kingdom | 251/172 |

Primary Examiner—Robert S. Ward, Jr.
Attorney, Agent, or Firm—Melvin R. Stidham

[57] ABSTRACT

A sealing mechanism particularly for a rotary valve wherein a recess around the valve body carries a resilient seal ring engageable with a sealing surface on the valve closure member. The resilient seal has a narrow sealing portion which extends through the narrow opening of the recess and a wider body portion which normally seats on shoulders within the recess. A pair of flexible lips extend radially from the body portion to engage and seat against converging recess walls. In closed position of the valve the body portion of the seal ring is forced away from the recess shoulders and the radial lips are forced into firm engagement with the converging walls to provide static seals on the valve body. Fluid on the high pressure side of the seal ring deflects the upstream lip away from the tapered walls and enters the recess cavity to force the downstream lip against the tapered wall and biases the seal ring into firmer sealing engagement.

17 Claims, 6 Drawing Figures

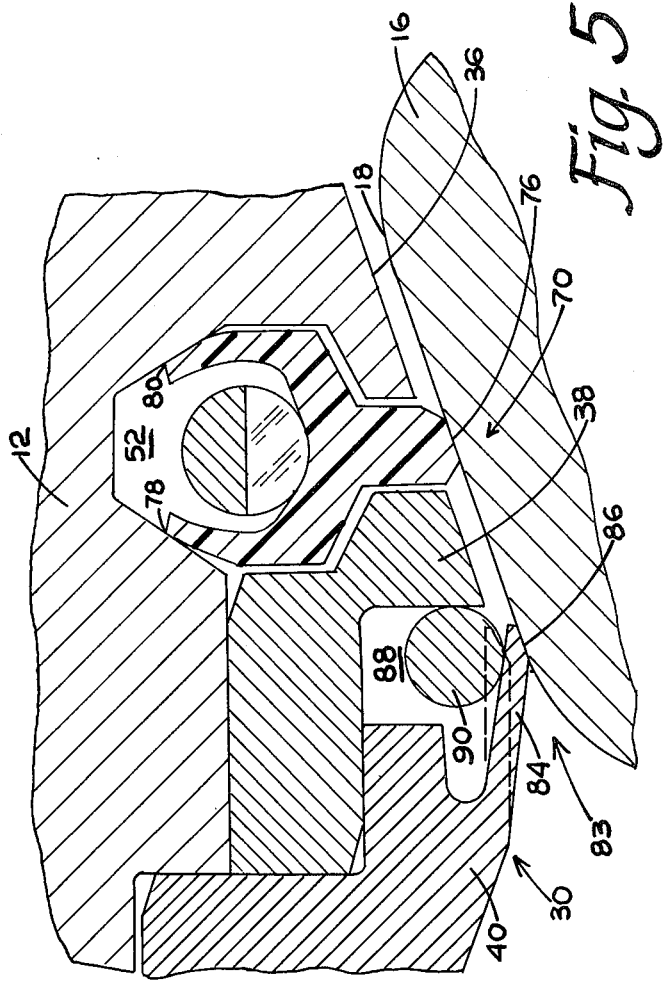
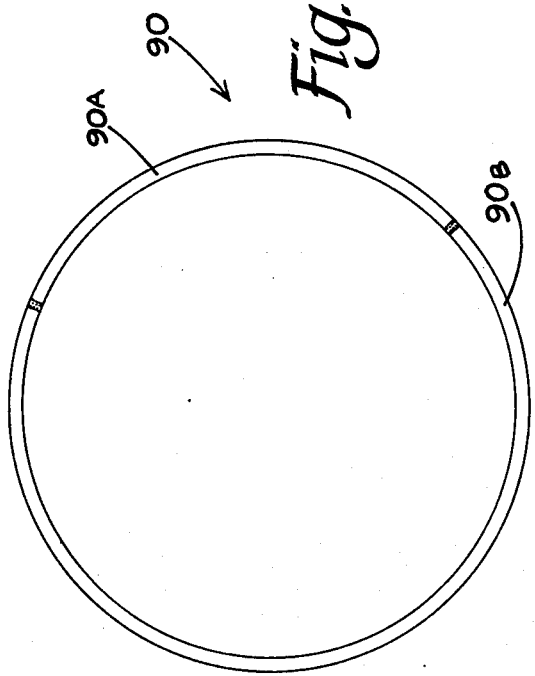
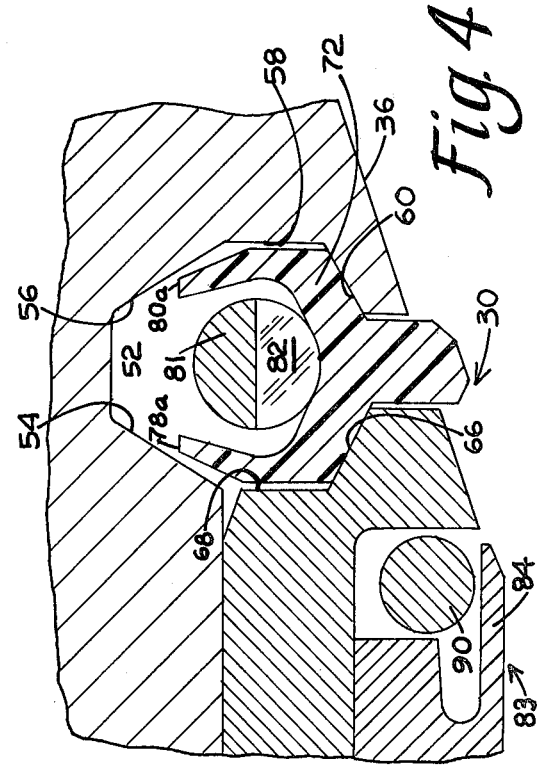

VALVE SEALING DEVICE

BACKGROUND OF THE INVENTION

There is always a need in the valve industry for a primary valve seal that is reliable in operation over a wide temperature range and irrespective of flow direction. Often manufacturing tolerances have to be kept extremely close in order to ensure integrity of seal throughout the valve service. Some have proposed mechanical biasing means and others have proposed pressure-augmented means to ensure an effective seal. However, such pressure seals tend to retard operation of the valve between open and closed positions.

There is a further need for a fire-safe valve and particularly for some means to effect a reliable seal at elevated temperatures without delaying the effectuation of such seal until after destruction of the primary seal and without suffering the consequences of continual metal to metal contact during normal operation.

OBJECTS OF THE INVENTION

It is an object of this invention to provide a valve sealing mechanism which provides an effective seal in closed position but does not offer any substantial resistance to valve operation.

It is a further object of this invention to provide a resilient single valve seal which is capable of effective sealing irrespective of the direction of fluid flow.

It is a further object of this invention to provide a sealing mechanism having a resilient seal which does not require a considerable clearance between seal and valve closure member in open position.

It is a further object of this invention to provide a valve sealing mechanism which is effective over a broad temperature range.

It is a further object of this invention to provide a valve sealing mechanism which is applicable to a wide variety of body types without requiring additional seals in the seal retainer area.

It is a further object of this invention to provide a valve sealing device having a reliable secondary seal which ensures an effective seal despite fire-destruction of a resilient primary seal.

It is a further object of this invention to provide a firesafe seal which is normally inactive but which is activated at abnormally high temperatures below that at which the material of the primary seal becomes ineffective.

Other objects and advantages of this invention will become apparent from the description to follow, particularly when read in conjunction with the accompanying drawings.

SUMMARY OF THE INVENTION

The sealing device of this invention is particularly applicable to a rotary valve, such as a butterfly valve and comprises a resilient seal of a suitable elastomer carried in the valve body, around an annular sealing surface on the valve disc. The recess has a narrow opening, forming shoulders extending to spaced substantially radial side walls. Above the shoulders the walls on the valve body are tapered inward toward the bottom of the recess to form static seal surfaces. The seal ring has a narrow inner portion which extends through the narrow opening followed by the main body portion which, in open position of the valve, normally seats on the recess shoulders. A pair of flexible lips extend radially outward from both sides of the seal ring body for engagement with the tapered walls of the recess. The outboard walls of the recess below the tapered walls are formed on a seal retainer ring which is removable to facilitate seal placement. But since the tapered walls are on the body itself, the flexible lips seal off all leak paths irrespective of flow direction and do not require additional seals. The narrow inner sealing portion has a normal inner diameter less than that of the closure disc sealing surface whereby in closed position the seal disc is stretched outward to force the body portion off the recess shoulders and the annular radial lips into firm sealing engagement with the tapered walls of the recess, providing effective static seals. When the valve is first closed, the upstream fluid pressure deflects the upstream lip inwardly to allow fluid to flow around the seal body and the upstream lip to enter the recess cavity. The fluid so entrapped acts against the downstream lip to force it against the tapered recess wall and against the seal ring body to force it radially inwardly into firm sealing engagement with the valve closure disc. When the valve is open, the pressure behind the seal ring forces it inward against the shoulders and then vents itself around the flexible radial lips into the line. Also carried on the valve body is a cantilevered flexible sleeve or tube having a sealing lip at the free annular edge thereof. Carried around the cantilever sleeve is a restraining ring of a material having a low coefficient of thermal expansion. The cantilevered sleeve and the valve closure member have substantially the same coefficient of thermal expansion and normally there is a slight clearance between the sealing lip and the valve closure member, whereby there is no wear, scoring or galling in normal valve operation. In abnormally high temperatures as in the case of a fire in or around the flow line, the closure member and cantilever sleeve tend to expand together to maintain the slight clearance. However, the restraining ring, expanding at a much slower rate, restrains the cantilevered sleeve and constricts it circumferentially until the valve closure member expands to establish sealing engagement and to thereafter maintain such engagement. Preferably normal clearance is established and the coefficient of thermal expansion of the restraining ring is selected as by forming part of the ring of another metal such as the steel of the valve disc and seat rings, so that the cantilever sleeve will be deformed plastically, and the fire-safe seal effected at a selected temperature high enough to indicate the existence of a fire danger but below that at which the primary seal material becomes non-functional.

BRIEF DESCRIPTION OF THE DRAWING

In the drawings:

FIG. 4 is an enlarged section view of another seal ring embodiment; and

FIG. 5 is an enlarged section view illustrating the fire safe seal in the fire condition.

FIG. 6 is an elevation view of the fire-safe seal restraining ring.

DESCRIPTION OF A PREFERRED EMBODIMENT

Figure 1:
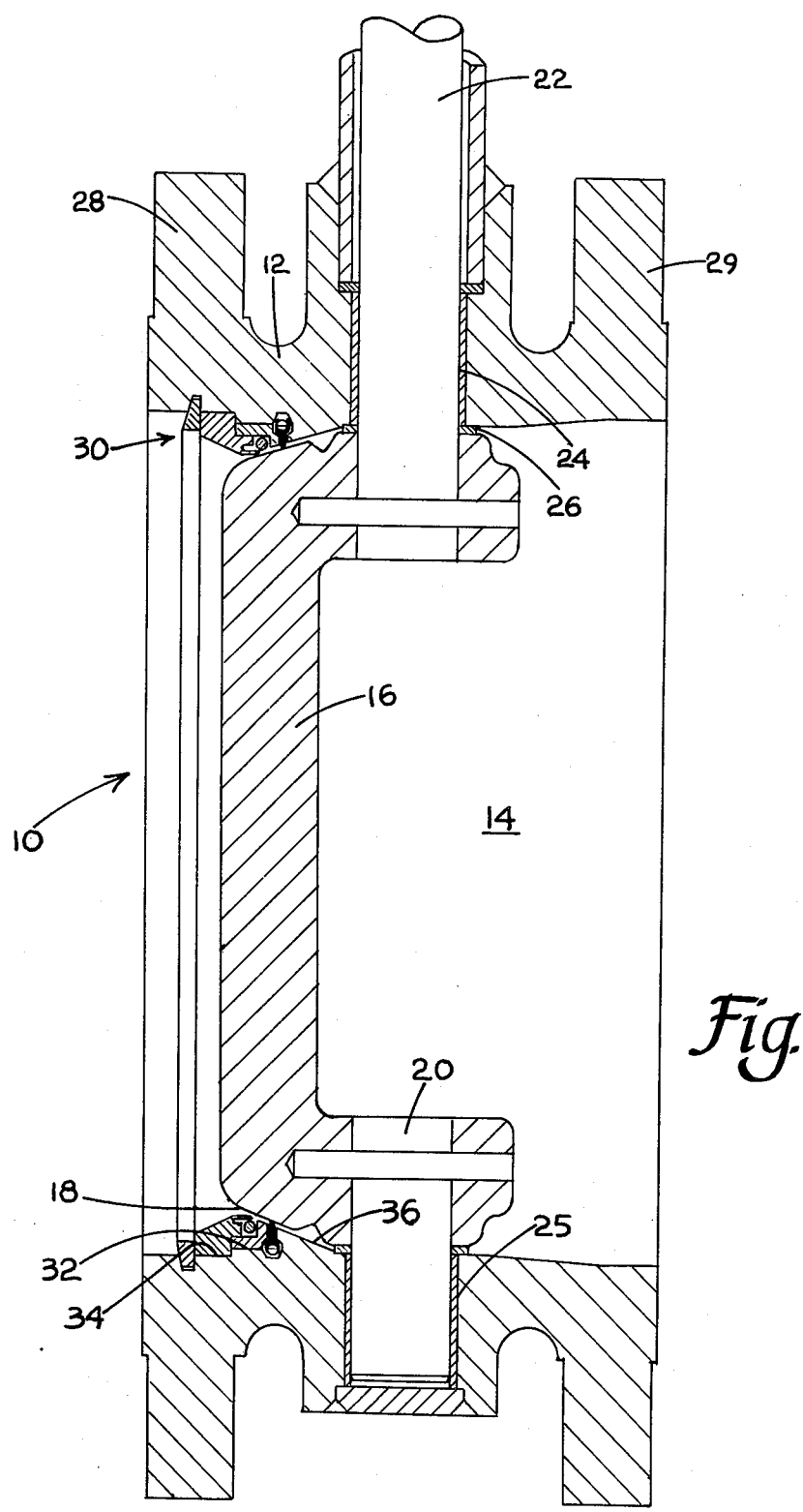
FIG. 1 is a vertical section view taken through a butterfly valve embodying features of this invention.

Referring now to FIG. 1 with greater particularity, the butterfly valve 10 embodying features of this invention includes a generally cylindrical valve body 12 having a flow passage 14 therethrough. Rotatably carried in the valve body is a valve disc 16 having outer sealing surfaces 18 which may be of spherical or conical configuration. A stub or idler shaft 20 is pinned or otherwise secured at the bottom of the disc 16 and the operating stem 22 is secured to extend upwardly from the top of the disc. The stem and idler are carried in suitable bushings 24, 25 with suitable thrust washers and the like 26 provided to facilitate operation. The valve body 12 is adapted, as by the provision of flanges 28 and 29 for installation into a pipeline (not shown) and carried in the valve body is the seal device 30 of this invention, mounted in a bore 32 and counterbore 34 in the generally conical inner surface 36 of the valve body.

Figure 2:
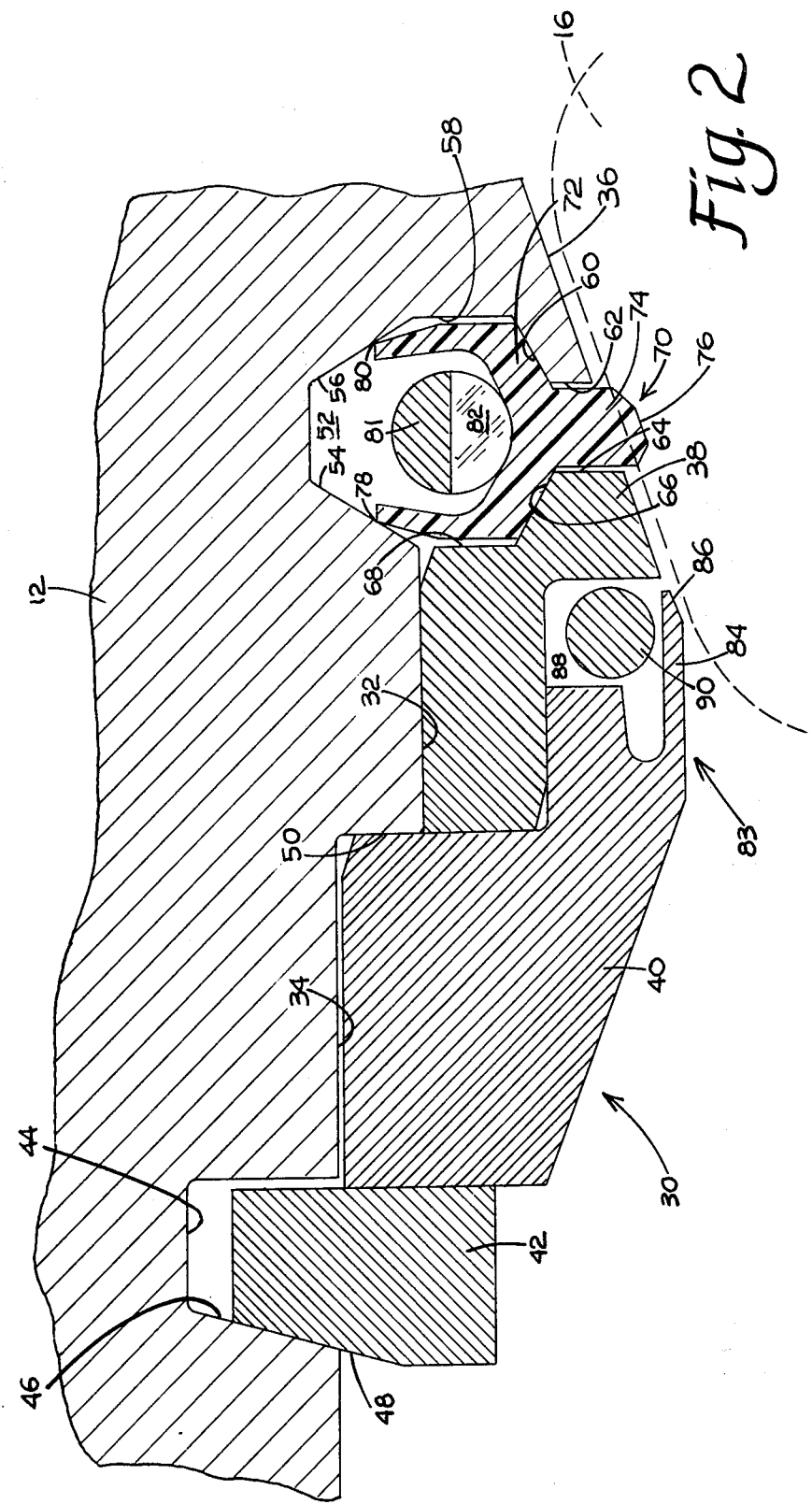
FIG. 2 is an enlarged section view of the seal device of this invention with the valve in open position.

Referring now more particularly to FIG. 2 the bore 32 slidably receives a seal retainer ring 38 which is carried on a fire-safe ring 40, to be described hereinafter, and the entire assembly is held in place by a split retainer ring 42 carried in an annular recess 44 around the counterbore 34. The outboard wall 46 of the recess and the complementary wall 48 of the retainer ring are tapered inward as indicated, whereby by wedging action, the ring 42 will hold the fire-safe ring 40 firmly against the internal shoulder 50 in the valve body 12.

Formed at the inner end of the bore 32 and, hence on the body 12 itself, is an annular seal recess 52 having tapered inner wall portions 54 and 56. The tapered sidewall portion 56 merges into a substantially radial outer side wall portion 58 which terminates in a tapered shoulder 60 extending to a radial outer wall 62 which forms, with the radial inner wall of the seal retainer ring 38, a narrow seal opening. Outward of the radial wall 64 is a tapered shoulder 66 complementary to shoulder 60 and, finally, a radial wall 68 is complementary with radial wall 58 in the valve body 12.

The resilient seal 70 has a main body portion 72 which is of a normal inner diameter to seat on the shoulders 60 and 66 with a relatively narrow sealing portion 74 extending through the narrow opening between the walls 62 and 64. Preferably, the edges of the sealing extension 74 are chamfered to provide a narrow sealing surface 76 to concentrate sealing forces and to facilitate engagement of the disc seal surface 18 with the sealing extension 74.

Extending radially from the main body portion of the seal is a pair of annular flexible sealing lips 78 and 80 which are adapted to seal against the inclined surfaces 54 and 56 of the seal recess. It will be noted that with the main body of the seal 72 seated on the shoulders 60 and 66 the sealing portion 74 protrudes from the opening between walls 62 and 64 far enough to interfere with the valve disc 16 as shown in phantom in FIG. 2. Hence, when the valve is in closed position as shown in FIG. 3, the resilient seal 70 is stretched somewhat to lift the main seal body off of the shoulders 60 and 66 and force the static seal lips 78 and 80 into firm sealing engagement with the inclined walls 54 and 56.

Since the inclined walls 54 and 56 are both on the body 12, the sealing lips 78 and 80 seal off the leak paths around the seal retainer ring 38, and there is no need for another seal ring between the body 12 and the seal retainer ring 38.

Figure 3:
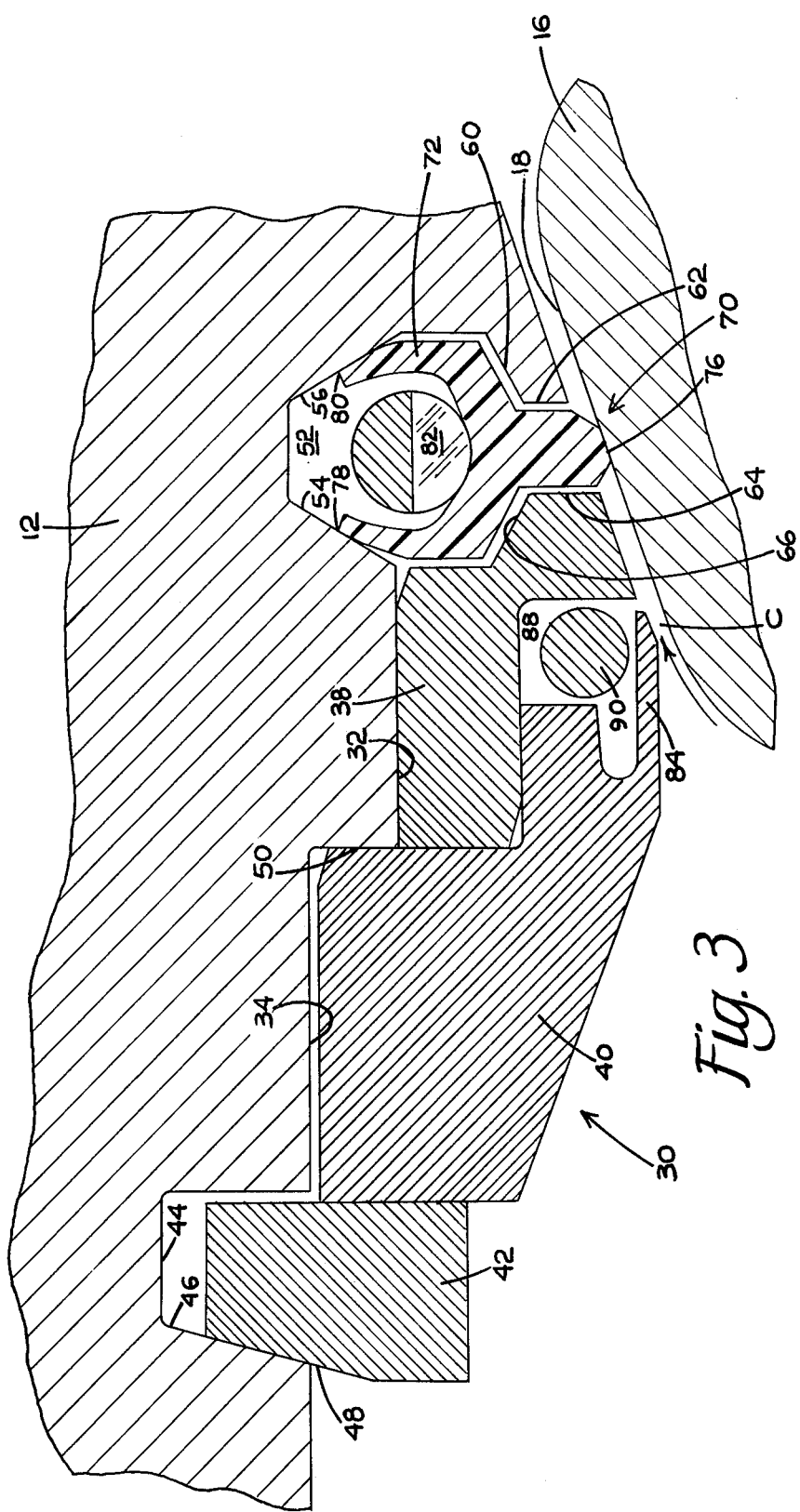
FIG. 3 is an enlarged section view of the seal device with the valve in closed position.

If the upstream pressure is on the left as indicated by the arrow in FIG. 3, when the valve disc is initially moved to closed position, fluid will flow around the main body of the seal 72, past the sealing lip 78 which acts in a nature of a flapper check valve, and into the cavity 52. The upstream pressure in the cavity 52, sealed off by static seal 80, acts over a much greater area behind the seal than against the front, where it acts out to the seal surface 76. The resultant force differential biases the seal ring 70 into firm sealing engagement with the disc surface 18.

Even at very low pressures sealing engagement of the dynamic seal 76 can be ensured by a metal hoop spring 81 which is of a normal diameter to restrain the body portion 72 of the seal to seat on the shoulders 60 and 66 and when expanded as the seal is forced outward by engagement around the valve disc 16 transmit hoop tension to seal 72 bearing it against the valve seal surface 18. In addition, the hoop 81, being of the same thermal expansion as the disc 16, serves to restrain expansion of certain plastic materials at high temperatures to keep the seal 72 in sealing engagement. The hoop tension from the ring 81 may be transmitted through arcuate segments 82 around the cavity 52.

If the high pressure side is on the right in FIG. 3, the fluid flows past seal lip 80 into the valve cavity, again to bias the seal ring 70 towards the valve disc 16. In addition, the lip 78 is forced against the inclined suface 54 on the body 12 leaving no exposure to a leakage path around the rings 38 and 40. In either case, when the valve is again opened, the seal body 72 will again drop to the shoulders 60 and 66, allowing the pressure within the recess 52 to relieve past the lips 78 and 80 and into the line.

When the seal is effectuated as above described, the upstream pressure from whichever direction acts over the full area of the seal within the cavity 52 to bias the seal ring 72 inward. On the inner diameter of the seal this same pressure acts outward only over the area between the upstream side of the seal ring 72 and the effective seal diameter under sealing face 76. Hence, the differential in areas assures a positive sealing bias.

Referring now to FIG. 4 effective bleeding of the recess 52 can be assured by forming the static seal lips 78a and 80a so that when the body of the seal drops down against the shoulders 60 and 66 there is a clearance between the tapered walls 54 and 56 and the corresponding lip 78a and 80a.

Referring now to FIG. 5 there is illustrated the operation of the fire-safe seal 83. As there shown, the ring 40 is provided with a cantilever sleeve 84 having a sealing surface 86 around the free edge thereof. Carried on, or surrounding the sleeve 86 within a recess 88 formed between the rings 38 and 40 is a wire ring 90 of a material having a low coefficient of thermal expansion. For example, a nickel-iron alloy sold under the trademark "Invar" has a rate of thermal expansion approximately one-tenth that of carbon steel at temperatures up to 400° F. Hence, the wire 90 may be formed entirely of "Invar" or like material or the rate of thermal expansion of the circular ring 90 may be controlled by making it in part from "Invar" 90A (FIG. 6) and the balance from a steel material 90B of the same cross-sectional diameter. The percent of the total circumference made from "Invar" will determine the rate of thermal expansion of the ring 90. In this way, with the clearance C between the free end 86 of the cantilever sleeve or tube set at a predetermined clearance, say 0.015 to 0.020 inches the ring 90 may be formed with segments of "Invar" and steel in desired percentages of the total circumference so as to produce a desired rate of thermal expansion.

In operation, should temperatures become abnormally high, as in the event of fire, the disc 16, body 12 and other components, including the ring 40, all being of the steel material will expand at substantially the same rate. The cantilever sleeve or tube 84 will attempt to expand to the diameter shown in phantom in FIG. 5 but, being restrained by the ring 90, will be deflected and plastically deformed down into sealing engagement with the disc 16. Because the rate of thermal expansion of the ring 90 can be controlled as above described, this can be caused to occur at a temperature below that at which the material of the primary seal ring 70 becomes non-functional. Hence, the fire-safe design is independent of the primary seal and, does not depend upon disintegration of the primary seal before it is functional.

The restraining ring 90 floats freely in the recess 88 so that at low temperatures, as in cryogenic service the seal retainer ring 40 may contract whereby the retaining ring 90 expands relatively toward the outer diameter of the recess 88.

In operation then, with the valve in closed position there is a firm resilient seal at the outer lip 76 aided by pressure in the recess entrapped by static seal lips 78 and 80. In the meantime, in normal temperature operation and fire-safe seal lip 86 is clear of the surface of the disc 16, whereby there is no wear, scoring or galling during valve operation. Should the temperatures reach an abnormally high temperature causing the components, including the disc 16 and fire-safe ring 40 to expand, the restraining ring 90 will hold the sealing lip and deflect it into sealing engagement with the disc 16 deforming it plastically to maintain such seal. Hence, there is initially both a resilient seal at 76 and a metal to metal seal at 86. Then, even if the heat level increases to destroy the primary seal 70, the fire-safe seal 83 will continue to function. Moreover, because the sleeve 84 is deformed beyond its elastic limit the fire-safe seal will continue even after the valve 10 cools.

While the fire-safe seal 83 has been described particularly in a butterfly valve it is apparent that it could function to seal between radially spaced surfaces in a wide variety of pressure vessels and structures. For example, it could be used to supplement a stem seal and it could be employed on ball valves, spool valves and the like.

While this invention has been described in conjunction with a preferred embodiment thereof it is obvious that modifications and changes therein may be made by those skilled in the art without departing from the spirit and scope of this invention as defined by the claims appended hereto.

What is claimed as invention is:

1. In a valve comprising:
   a valve body member having a fluid flow passage therethrough; and
   a valve closure member movable between valve open and valve closed positions;
   an annular sealing surface on one of said members; and
   an opposing annular sealing device on the other of said members;
   said sealing device comprising;
   an annular groove having a relatively narrow opening and then increasing in width to the groove side walls to form a pair of shoulders on opposite sides of said opening;
   portions of said side walls converging away from said narrow opening; and
   a resilient seal ring in said annular groove;
   said seal ring having a narrow sealing portion extending through said narrow opening and a wider body portion engagable with said groove shoulders; and
   generally radial flexible lips extending from both sides of said body portion for sealing engagement with said converging side wall portions;
   said sealing portion in said valve open position being disposed to interfere with said annular sealing surface whereby in closed position said body portion is forced away from said shoulders and said radial lips are pressed against said converging side wall portions.

2. The sealing mechanism defined by claim 1 wherein:
   said annular seal surface and device are radially engageable; and
   the diameters of said seal ring body portion and the complementary diameters of said shoulders are normally substantially equal; and
   the diameter of said narrow sealing portion and said annular sealing surface are in interference.

3. The sealing mechanism defined by claim 1 wherein:
   said annular seal surface is on a rotary valve closure member and said sealing device is on said valve body around said annular seal surface;
   the inner diameters of said body portion and the complementary diameters of said shoulders are normally substantially equal;
   the inner diameter of said narrow sealing portion is less than the outer diameter of said annular seal surface.

4. The sealing mechanism defined by claim 2 wherein:
   said lips may be distorted out of sealing engagement by fluid pressure flowing radially outward.

5. The sealing mechanism defined by claim 4 wherein:
   said narrow sealing portion is axially intermediate said radial lips so that there is a greater area exposed to upstream pressure over the outer periphery of said seal ring than over the inner periphery.

6. The sealing mechanism defined by claim 4 wherein:
   said radial lips converge toward each other away from said body portion to facilitate inward displacement thereof.

7. The sealing mechanism defined by claim 3 wherein:
   the wide side wall portion, the groove shoulder and the narrow opening wall on the side of said groove on the outboard side of the seal ring, away from the valve closure axis are formed on a seal retainer ring; and
   said converging side wall portions are in the inner wall of said valve body.

8. The sealing mechanism defined by claim 3 including:
   an annular cantilevered metal sleeve on said valve body around said annular seal surface;
   a sealing lip on the free end of said cantilevered sleeve; and
   a restraining ring around said metal sleeve;
   said restraining ring being of a material having a lower coefficient of thermal expansion than said metal sleeve and said valve closure member;
   there being normally a slight clearance between said sealing lip and said annular seal surface.

9. The sealing mechanism defined by claim 8 wherein:

the coefficient of thermal expansion of said restraining ring is selected to close said slight clearances at abnormally high temperatures at which said resilient seal ring material is intact and effective to seal.

10. In a pressure vessel comprising:

a metal body having a fluid flow passage therethrough; and a metal closure member in said body having an outer sealing surface thereon; and a heat destructable primary seal on said body;

the combination therewith of a fire-safe seal comprising:

an annular cantilevered metal sleeve on said body around said sealing surface;

a sealing lip on the free end of said cantilevered sleeve;

a restraining ring around said metal sleeve;

said restraining ring being of a material having a lower coefficient of thermal expansion than said metal sleeve and said closure member;

there being normally a slight clearance between said sealing lip and said annular seal surface.

11. The fire-safe seal defined by claim 10 wherein:

the coefficient of thermal expansion of said restraining ring is selected to close said slight clearances at abnormally high temperatures at which said primary seal ring material is intact and effective to seal.

12. The fire-safe seal defined by claim 10 wherein:

said restraining ring is made of a nickel-iron alloy; and said closure member and said cantilevered sleeve are of steel.

13. The fire-safe seal defined by claim 10 wherein:

said restraining ring comprises arcuate lengths of steel and a metal having a low coefficient of thermal expansion welded together to form a ring.

14. The fire-safe seal defined by claim 10 wherein:

said last-named material is a nickel-iron alloy.

15. The fire-safe seal defined by claim 10 including:

a metal ring slidably mounted in said body;

means retaining said ring in said body;

said cantilevered sleeve forming an integral axial extension of said sleeve.

16. The fire-safe seal defined by claim 11 wherein:

said clearance and said coefficient of thermal expansion are selected to distort said cantilevered sleeve beyond its elastic limit and cause plastic deformation thereof in sealing engagement with said closure.

17. The fire-safe seal defined by claim 10 wherein:

said pressure vessel is a rotary valve; and said closure member is rotatably mounted in said body.

* * * * *